F. R. BARKER.
WHEEL RIM.
APPLICATION FILED FEB. 7, 1911.

1,055,696.

Patented Mar. 11, 1913.

2 SHEETS—SHEET 1.

Witnesses.
Leonard A. Powell
Annie J. Dailey

Inventor.
Frederic R. Barker,
by his attorney, Charles S. Gooding.

F. R. BARKER.
WHEEL RIM.
APPLICATION FILED FEB. 7, 1911.

1,055,696.

Patented Mar. 11, 1913.

2 SHEETS—SHEET 2.

Witnesses.
Leonard A. Powell.
Annie J. Dailey.

Inventor.
Frederic R. Barker,
by his attorney, Charles S. Gooding.

UNITED STATES PATENT OFFICE.

FREDERIC R. BARKER, OF BOSTON, MASSACHUSETTS, ASSIGNOR TO JAMES CHARLES LEWIS, OF BOSTON, MASSACHUSETTS.

WHEEL-RIM.

1,055,696.   Specification of Letters Patent.   Patented Mar. 11, 1913.

Application filed February 7, 1911. Serial No. 607,195.

*To all whom it may concern:*

Be it known that I, FREDERIC R. BARKER, a subject of King George V of England, residing at Boston, in the county of Suffolk and State of Massachusetts, have invented new and useful Improvements in Wheel-Rims, of which the following is a specification.

This invention relates to improvements in wheel rims and particularly rims intended for use in connection with pneumatic tires. There are now in use two types of rims, one known as demountable rims and the other as quick-detachable rims, although the latter might be appropriately called divisible rims. In the use of demountable rims, it is customary to have one or more spare rims with ready inflated tires thereon so that in case of a puncture or other injury to one of the tires in use on the vehicle the injured tire with its rim may be removed and replaced by another demountable rim and ready inflated tire. In the so-called quick detachable or divisible rims, there is provided a ring commonly called a bead which is detachable from the rim to allow the tire to be removed in order that the inner tube may be removed from the outer casing or shoe for repair or replacement.

The object of my invention is to provide improved means for facilitating the attaching of a demountable rim or attaching a bead to the permanent rim.

Still other objects and advantages will appear hereinafter.

To these ends, my invention consists in the novel features of construction and in the combination and arrangement of parts set forth in the following specification and particularly pointed out in the claims.

Figure 1:
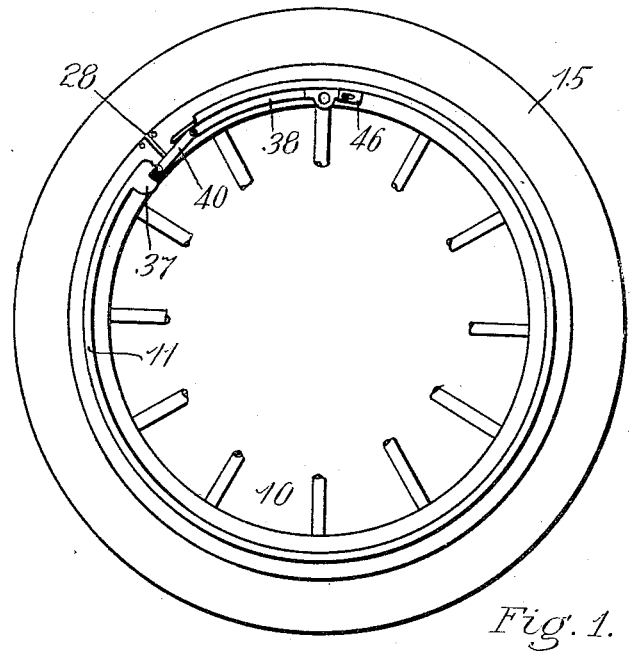
Figure 2:
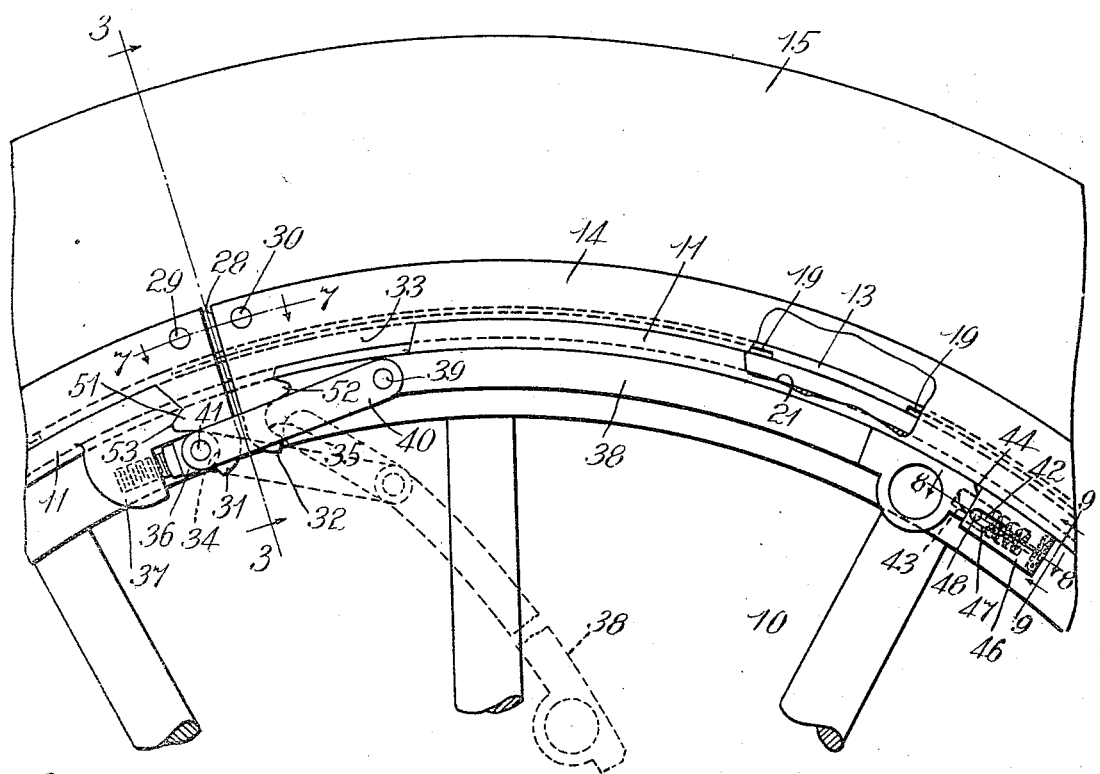
Figure 3:
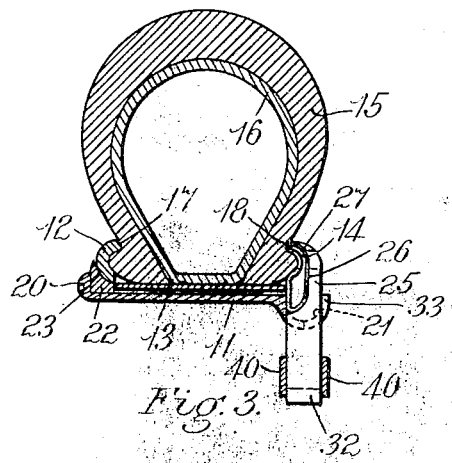
Figure 5:
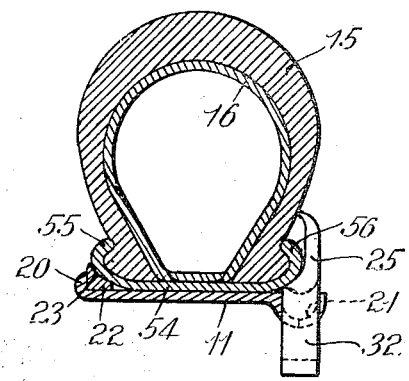
Figure 4:
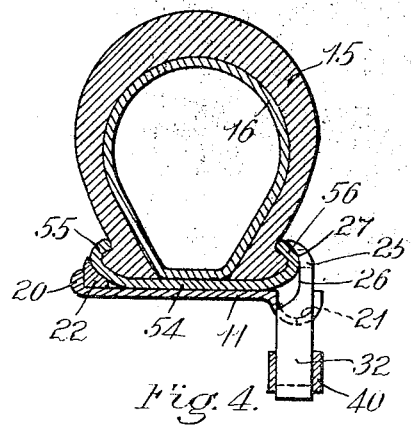
Figure 6:
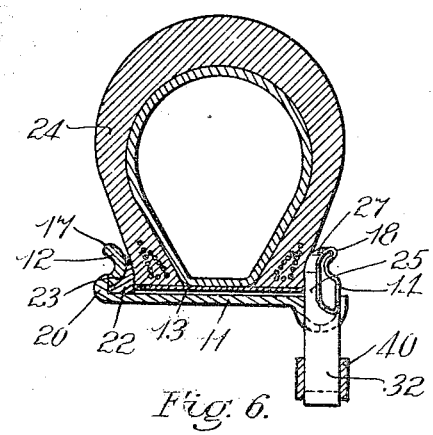
Figure 8:
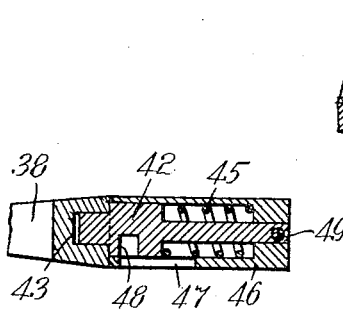
Figure 7:
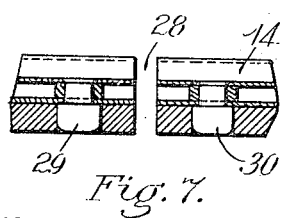
Figure 9:
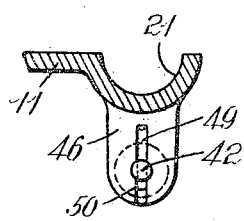

Referring to the drawings: Figure 1 is a side elevation of a rim embodying my invention showing the same in connection with a wheel and tire. Fig. 2 is an enlarged detail side elevation of a portion of the rim, tire and wheel showing the means for securing the demountable rim to the permanent rim. Fig. 3 is a sectional view taken on line 3—3 of Fig. 2, looking toward the right, showing in place upon the permanent rim a removable rim composed of a plurality of pieces as arranged with a clencher type tire. Fig. 4 is a sectional view similar to Fig. 3, showing the permanent rim having mounted thereon a demountable rim. Fig. 5 is a sectional view similar to Fig. 4, showing the retaining ring in expanded position preparatory to removing the same. Fig. 6 is a sectional view of the rim as arranged for a straight side tire. Fig. 7 is a sectional view taken on line 7—7 of Fig. 2, looking in the direction of the arrow on said line. Fig. 8 is a sectional view taken on line 8—8 of Fig. 2, looking in the direction of the arrow on said line. Fig. 9 is a sectional view taken on line 9—9 of Fig. 2, looking in the direction of the arrow on said line.

Like numerals refer to like parts throughout the several views of the drawings.

In the drawings, 10 is a wheel which may be of any usual or desired construction having secured to its periphery a rim 11 which will be referred to as the permanent rim, since it remains attached to the wheel. Mounted upon this permanent rim is a removable rim which may be composed of a plurality of pieces, as shown in Figs. 3 and 6, or may consist of a single piece, as shown in Figs. 4 and 5, the principle being the same in both cases.

Referring to Figs. 3 and 6, and more particularly to Fig. 3, the removable rim shown therein is composed of a plurality of parts 12, 13 and 14 which receive a tire 15 of the clencher type, these parts surrounding and being mounted upon the permanent rim 11. The tire 15 is provided as usual with an inner tube 16. The parts 12 and 14 will be hereinafter referred to as rings or beads and the part 13 will be referred to as a band.

The ring or bead 12 is provided with a lip 17 and the ring or bead 14 is provided with a similar lip 18 both of which engage the tire in the usual manner, while the base of the tire rests upon the band 13. Preferably, this band is made as light as possible and to that end is preferably provided at intervals with suitable recesses 19, see Fig. 2, and may be made of aluminum which has the advantage of being not only light, but non-corrosive as well and, therefore, will not rust onto the base of the tire. The ring or bead 14 is also preferably made as light as possible and to that end is preferably formed hollow, as shown in Fig. 3, and may also be made of aluminum, if desired.

The permanent rim 11 is preferably provided at one side with a circumferential flange 20 and at its other side is preferably provided with a circumferential groove 21. The flange 20 forms an abutment for a ring 22 having a laterally inclined outer circumferential surface 23 against which the inner laterally inclined circumferential surface of the bead or ring 12 rests. The ring 22 is preferably made separate from the permanent rim 11 so as to be capable of being removed and reversed to occupy the position shown in Fig. 6 for use with a tire 24 of the straight side type, in which case the bead 12 will also be reversed so that its lip 17 will be turned outwardly.

The ring or bead 14 is preferably held in place by a ring 25 preferably provided with a lateral recess 26 to receive the bead 14 and preferably this recess is provided with an inner laterally inclined circumferential surface 27 which fits against a correspondingly shaped circumferential surface of the bead 14, as shown in Fig. 3. Preferably, the bead or ring 14 and the ring 25 are both expansible and contractible and to this end are preferably interrupted, or, in other words, provided with a slot 28, see Figs. 2 and 7, and preferably both rings are so made that when released they will expand readily.

Preferably, the bead 14 and ring 25 are provided with suitable means to prevent relative circumferential movement and for this purpose I prefer to employ two dowel pins 29 and 30 secured to one ring and projecting into corresponding perforations in the other, in the present instance, said pins being secured to the bead 14. The rings 14 and 25 are provided with suitable means for changing their diameters and for this purpose. I preferably employ the mechanism which I will now proceed to describe.

The ring 25 is provided with two lugs 31 and 32 located on opposite sides of the slot 28, said lugs extending inwardly through a suitable slot 33 provided in the permanent rim 11, see particularly Fig. 2, this slot being preferably open along its outer side. The lug 31 is preferably provided with a recess 34 and the lug 32 with a corresponding recess 35, the recess 34 receiving a suitable abutment 36 preferably consisting of a stud having screw-threaded engagement with a lug 37 on the permanent rim 11 so as to be capable of being adjusted to vary the force of the clamping mechanism, as will hereinafter appear. The recess 35 receives the correspondingly shaped end of a lever 38 preferably formed concentric with the rim 11 and fulcrumed on a pivot 39 upon a pair of links 40, said links being fulcrumed upon a pivot 41 upon the stud 36. The lever 38 is interposed between the links 40 and the lugs 31 and 32 are also interposed between said links.

The mechanism just described constitutes a powerful toggle which, when swung from the position shown in dotted lines in Fig. 2 to the position shown in full lines therein, will very forcibly draw the lugs 31 and 32 toward each other, thus contracting the ring 25. This serves to lock the ring 25 and hold the bead 14 in place.

Preferably, the fulcrum 39, the fulcrum 41 and the end of the lever 38 engaging the lug 32 as a fulcrum all lie in a substantially straight line so that the toggle naturally tends to remain locked in its normal position. As an additional safeguard, however, I provide a suitable spring-pressed latch 42 interengaging with the lever 38 in a suitable manner, preferably by providing said lever with a recess 43 in its end to receive the latch 42 and preferably said lever is provided with an inclined surface 44 adjacent to and inclined toward said recess for the purpose of automatically retracting the latch when the lever 38 is swung into its normal position, in which case the latch will ride up the incline 44 and snap into the recess 43 under the influence of a suitable spring 45.

The latch 42 is preferably mounted to slide in a lug 46 on the permanent rim 11, said lug being preferably provided with a lateral slot 47 and said latch being preferably provided with a lateral recess 48 which is accessible through said slot so that some suitable instrument may be inserted through the slot 47 into the recess 48 in order that the latch may be withdrawn from the recess 43. The latch 42 which is preferably cylindrical in form is held against rotation by suitable means such, for example, as a cotter pin 49 located in a slot 50 provided in the lug 46, this cotter pin also serving as a means for preventing said latch from traveling too far under the influence of the spring 45.

The lugs 31 and 32 are preferably provided with similar projections 51 and 52 and the lug 37 is provided with a correspondingly shaped recess 53 to receive the lug 51 or to receive the lug 52 in case the ring 25 should be removed and reversed so as to occupy the position shown in Fig. 6, which position said ring occupies when used in connection with a tire of the straight side type.

I do not herein claim broadly the toggle mechanism just described for contracting the ring 25, but in its broader aspects this toggle forms the subject matter of an application of myself and Joseph Greenwood, filed August 24, 1910, Serial No. 578,760.

As before stated, the bead 12, the band 13 and the bead 14 constitute as it were a three-part removable rim which may be removed together with the tire so that there may be substituted therefor another tire provided with a single piece demountable rim 54 provided with the usual inwardly turned lips 55 and 56 to engage a tire of the ordinary clencher type. When this rim is slipped into place, it engages at one side the laterally inclined surface 23 of the ring 22 and the other side of said rim is located in the recess 26 of the ring 25 and when this ring is contracted, as shown in Fig. 4, the laterally inclined inner circumferential surface 27 engages the correspondingly shaped outer circumferential surface of the rim 54, thus crowding said rim inwardly and toward the left. As a consequence, the rim 54 is crowded against the inclined surface 23 and is also drawn firmly against the permanent rim 11.

The recess 26, it will be observed, is of such depth radially that when the ring 25 is expanded from the position shown in Fig. 4 to the position shown in Fig. 5, the inner circumferential surface of said ring becomes substantially coincident with the outer circumferential surface of the permanent rim 11 and since the slot 33 is open at the side, said ring may then be withdrawn outwardly from its place so as to permit the removal of the demountable rim 54. It will now be evident that if the tire when arranged upon the rim, as shown in Fig. 3 should become punctured or otherwise injured so that it becomes necessary to remove the same for repair this may be accomplished by removing the ring 25 and bead 18 and then slipping the tire 15 and band 13 from their place upon the permanent rim 11 and the tire may then be repaired and replaced. This is done if one has plenty of time and the conveniences for making the necessary repair. If, however, it is not convenient to repair the tire at the time, the bead 12 may be slipped from its place and a fresh tire ready inflated upon the rim 54 slipped on in place of the other rim and locked onto the permanent rim in a few moments' time.

The rim, as before stated, also has the advantage of permitting the use of a tire of the straight side type by simply reversing the beads and rings, as shown in Fig. 6. Thus it will be evident that the rim is practically universal. One further advantage of the rim is that when the tire is removed together with the band 13, the tire may remain on the band and the band will prevent the entrance of foreign matter into the interior of the tire and in this way the usual casing or protective covering for the tire may be dispensed with and the tire may be strapped on the vehicle without danger of any dirt getting into the tire.

Having thus described my invention, what I claim and desire by Letters Patent to secure is:

1. The combination with a rim, of an expansible and contractible ring mounted on said rim, means to change the diameter of said ring, said means including a lever, a spring-pressed latch interengaging with said lever to lock the same against swinging movement, and a casing in which said latch is mounted, said casing being provided with a lateral slot and said latch being provided with a lateral recess accessible through said slot.

2. The combination with a rim, of an expansible and contractible ring mounted on said rim, means to change the diameter of said ring including a lever provided with a recess and a surface adjacent to and inclined toward said recess, and a spring-pressed latch entering said recess and having an inclined surface adapted to engage the first-mentioned inclined surface to retract said latch before entering said recess.

In testimony whereof I have hereunto set my hand in presence of two subscribing witnesses.

FREDERIC R. BARKER.

Witnesses:
 LOUIS A. JONES,
 SADIE V. MCCARTHY.